United States Patent [19]

Takeoka et al.

[11] Patent Number: 5,043,954
[45] Date of Patent: Aug. 27, 1991

[54] APPARATUS FOR PREVENTING TURNING-IN AND TRANSMITTER FOR VEHICLE

[75] Inventors: Seiei Takeoka, Yokohama; Masami Ebihara, Tone, both of Japan

[73] Assignee: Niles Parts Co., Ltd., Tokyo, Japan

[21] Appl. No.: 339,869

[22] Filed: Apr. 17, 1989

Related U.S. Application Data

[63] Continuation of Ser. No. 867,927, May 29, 1986, abandoned.

[30] Foreign Application Priority Data

Feb. 21, 1986 [JP] Japan .................. 61-02503[U]

[51] Int. Cl.⁵ ............................ H04B 17/00
[52] U.S. Cl. ........................ 367/176; 367/901
[58] Field of Search ........ 367/140, 176, 905, 152, 367/153, 901; 181/400

[56] References Cited

U.S. PATENT DOCUMENTS

| | | | |
|---|---|---|---|
| 3,296,586 | 1/1967 | Midlock et al. | 367/140 |
| 3,928,777 | 12/1975 | Massa | 367/152 |
| 4,155,066 | 5/1979 | Galvin | 367/140 |
| 4,463,453 | 7/1984 | Cohen et al. | 367/140 |
| 4,695,985 | 9/1987 | Takeoka | 367/87 |
| 4,739,860 | 4/1988 | Kobayashi et al. | 367/140 X |
| 4,796,726 | 1/1989 | Kobayashi et al. | |
| 4,944,336 | 7/1990 | Stembridge et al. | 367/176 X |

FOREIGN PATENT DOCUMENTS

| | | | |
|---|---|---|---|
| 52-9335 | 2/1977 | Japan . | |
| 0021953 | 2/1978 | Japan | 367/140 |
| 0218295 | 12/1983 | Japan | 367/140 |
| 59-36680 | 3/1984 | Japan . | |

Primary Examiner—Thomas H. Tarcza
Assistant Examiner—Tod Swann
Attorney, Agent, or Firm—Ronald P. Kananen

[57] ABSTRACT

An apparatus for preventing a direct turning-in of the supersonic wave from the opening of the sender to the opening of the receiver in a supersonic wave device for a vehicle in which an object placed near the vehicle body id detected by the supersonic wave. A cylindrical turning-in preventive member made of foamed material having discrete bubbles is arranged at the opening of the sender or the receiver.

16 Claims, 3 Drawing Sheets

APPARATUS FOR PREVENTING TURNING-IN AND TRANSMITTER FOR VEHICLE

This application is a continuation, of application Ser. No. 06/867,927, filed May 29, 1986 now abandoned.

BACKGROUND OF THE INVENTION

This invention relates to a supersonic wave apparatus installed in a vehicle for detecting a vehicle height relative to a road surface and the like with a reflected wave in a supersonic wave sensor. More particularly, this invention relates to an apparatus for preventing a turning-in or "roundabout" of the wave in the supersonic wave transmitter and receiver for the vehicle.

As described in Japanese Patent Laid-Open No. 116959/75, various types of supersonic wave sensors have been developed and used for detecting a distance to an object and a presence or absence of the object with a reflected wave from a supersonic wave sensor. Further, various types of supersonic wave sensors have been developed to be installed in the vehicle when high performance is required. In particular, such a sensor may be installed at the outside of the vehicle, for example, to act as a vehicle retracting sensor or a so-called "back-sonar" used for detecting an obstacle placed behind the vehicle. A supersonic road-surface sensor may also be installed in a so-called supersonic suspension which has been developed for measuring a variation in vehicle height corresponding to a road surface condition, such as a bad road surface, during running of the vehicle and controlling an attenuation force of a shock absorber to the most appropriate form. Thereby, a comfortable feeling in riding and a stability in driving the vehicle are improved.

FIG. 5 illustrates a side elevational view of a conventional supersonic wave sensor. In FIG. 5, a sender 1 is provided to transmit a supersonic wave to a receiver 2 to receive the supersonic wave from the sender 1. An insulator 3, made of foamed rubber and the like, protects the sender 1 and the receiver 2. A base plate 4 is provided with circuit elements 5 which are protected by a filler agent 6. A case 7 is provided for the foregoing elements In the case 7, a cone-shaped horn part 8 is formed at the front surfaces of the sender 1 and the receiver 2, and a heater 9 is held by a bracket 10 at the surface where the horn part is open to the exterior.

In the above-described prior art, the supersonic wave transmitted from the sender 1 reaches the receiver 2 as a direct wave in the air by diffraction or sidelobe and the like. It has been found that a wave is also transmitted along another path through a clearance provided by an assembly of the case 7, the heater 9, and the bracket 10.

The phenomenon in which the supersonic wave is transmitted directly from the sender 1 to the receiver 2 is a so-called "turning-in" or "roundabout" phenomenon. It has thus been necessary to provide a countermeasure to electrically prevent the circuit from sensing the received signal caused by a turning-in for a period from a time $t_o$ (m-sec), from transmitting of the supersonic wave, to a given time $T_1$ (m-sec) as shown in FIGS. 6 and 7 in order to prevent any erroneous operation caused by the turning-in of the wave. The characteristic curve i shown in FIG. 6 denotes a characteristic of the received signal caused by the turning-in of the wave. The characteristic curve j also shows a characteristic of the received signal of the reflected wave accepted from the object to be sensed by the supersonic wave sensor, for example, from a road surface and the like.

FIG. 7 shows a characteristic waveform of a timing pulse for use in exciting the sender 1 of FIG. 5. Therefore, as the duration time of the characteristic curve i of the turning-in action is extended, it is necessary to set an elongated prohibitive time $T_1$ (m-sec) Thus, an object at a short distance, wherein the time taken by the reflected wave to reach the receiver 2 is short, may not be detected. This resulting omission becomes a significant disadvantage in the supersonic wave road surface sensor used for detecting the road surface at a short distance. Thus, in the supersonic wave sensor, such as a supersonic wave road surface sensor, used for detecting an object at a short distance, either shortening the duration time of the turning-in phenomenon or reducing the frequency of the turning-in phenomenon has been a continuing problem.

SUMMARY OF THE INVENTION

A main object of the present invention is to provide an apparatus for preventing a turning-in of the wave in a supersonic wave receiver for a vehicle, wherein the turning-in phenomenon where a supersonic wave arrives directly from the sender to the receiver can be reduced.

This invention has a feature in which a cylindrical turning-in preventive member made of foamed material is arranged at an opening of either a sender or a receiver of a supersonic wave transmitter and receiver for transmitting the supersonic wave signal and receiving the reflected wave.

In the turning-in preventive device for a supersonic wave transmitter and receiver for a vehicle relating to the present invention, the above-described turning-in preventive member made of foamed material can reduce the supersonic wave turned from the sender to the receiver or its sidelobe and the like, with the result that the duration time of the phenomenon of the turning-in. action is shortened and the phenomenon of the turning-in action itself is reduced.

Therefore, it becomes possible to set a short prohibitive time $T_2$ (m-sec) and to detect an object at a short distance, such as at a distance between the vehicle body and the road surface. Since the turning-in preventive member made of foamed material is constituted by a member of foamed material having discrete bubbles, it may not absorb water as compared with that of continuous bubbles and therefore no icing may occur at a low temperature.

Various advantages of the present invention accompanied by other specific structures will be apparent from the detailed description hereinbelow and the drawings.

DESCRIPTION OF THE PREFERRED EMBODIMENT

Figure 1:
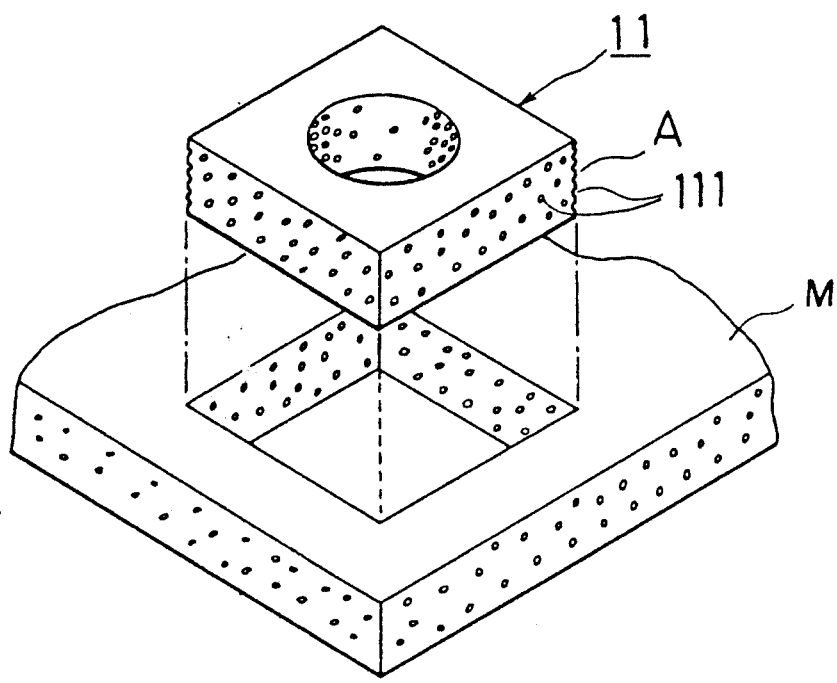
FIG. 1 is a perspective view to show a preferred embodiment of the present invention.

FIG. 1 is a perspective view to show a turning-in preventive member made of a foamed material which constitutes a preferred embodiment of the present invention.

In FIG. 1, a turning-in preventive member 11 made of foamed material is made in such a way that a mat M of foamed rubber or foamed polyurethane having discrete bubbles is punched by a die and formed into a cylindrical shape. The turning-in preventive member 11 of foamed material may generate a cut section A with a punching action and the cut section A has a plurality of exposed discrete bubbles 111.

Figure 2:
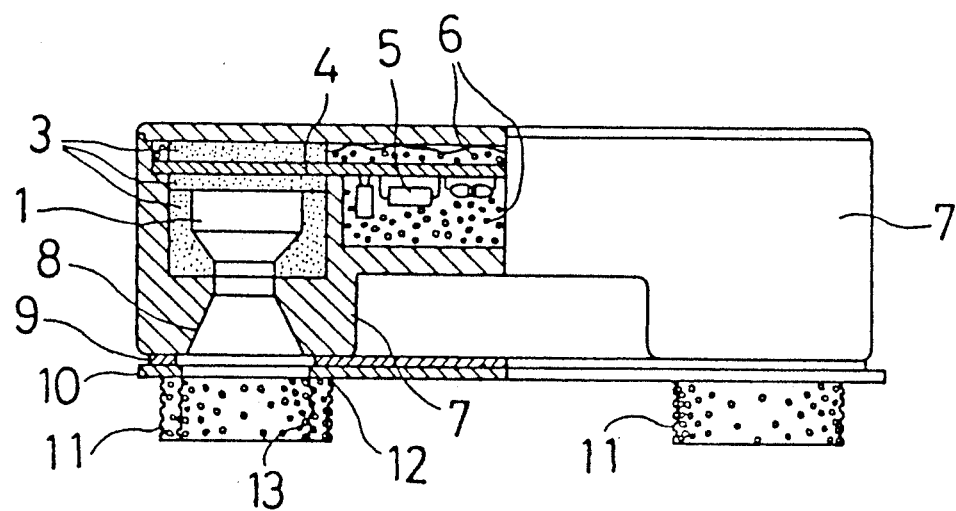
FIG. 2 is a side elevational view to show an arrangement in which a cylindrical turning-in preventive member made of foamed material shown in FIG. 1 is adapted to a supersonic wave transmitter and receiver.
Figure 6:
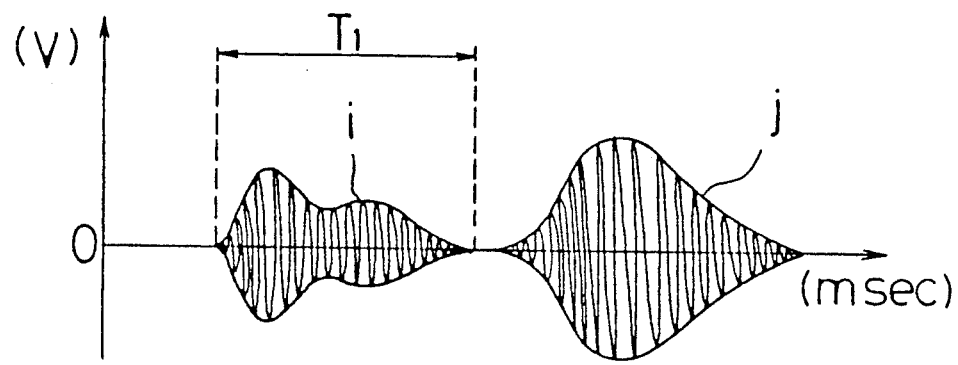
FIG. 6 is a diagram of an electrical characteristic of the received signal in accordance with the prior art.
Figure 7:
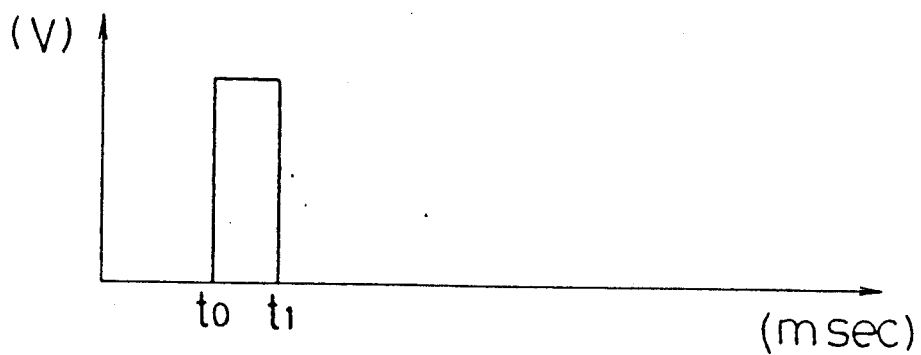
FIG. 7 is a diagram of the electrical characteristic of a timing pulse for exciting the sender in the prior art.

FIG. 2 is a side elevational view to show an arrangement in which the above-described cylindrical turning-in preventive member 11 made of foamed material is adapted to the supersonic wave transmitter and receiver. The same numbers in FIG. 2 as used in FIG. 6 showing the prior art designate similar components so its description will be eliminated.

The turning-in preventive member made of foamed material 11 is adhered to openings of the sender 1 and the receiver 2 in a bracket 10 with the aid of an adhesive member 12 such as a double surface type adhesive tape or adhesive.

With this foregoing arrangement, a sidelobe which is generated if there is no irregular surface is absorbed by an irregular surface 13 due to exposed discrete bubbles 111. Thus, a direction characteristic is improved and a turning-in of the wave is reduced.

Figure 3:
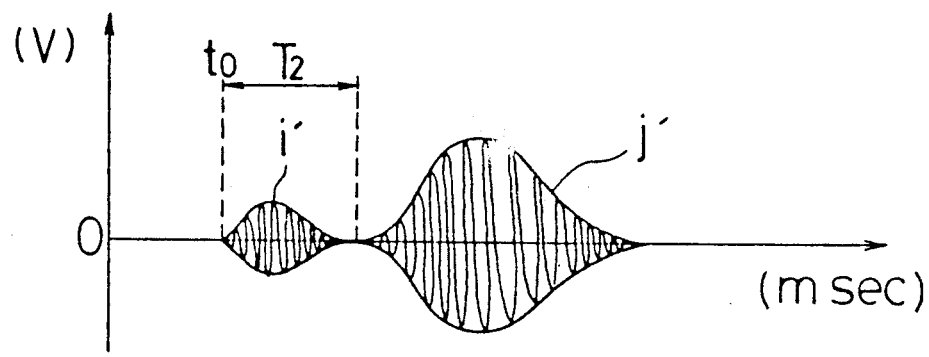
FIG. 3 is a diagram of an electrical characteristic waveform to show a characteristic of a received signal in a receiver constructed in accordance with the preferred embodiment of the present invention.

As described above, in the present invention, the turning-in of the wave can be reduced by the cylindrical turning-in preventive member 11 made of foamed material, so that as shown in FIG. 3 the duration time of the characteristic of the received signal i' caused by the turning-in of the wave is reduced and also the level is reduced.

Therefore, it becomes possible to set a short prohibitive time $T_2$ (m-sec) and to detect an object at a short distance such as at a distance between the vehicle body and the road surface. Since the turning-in preventive member 11 made of foamed material is constructed by a foamed material having discrete bubbles, water may not be absorbed as compared with the material having continuous bubbles or paths through the material. Thus, no icing may occur at a low temperature.

Figure 4:
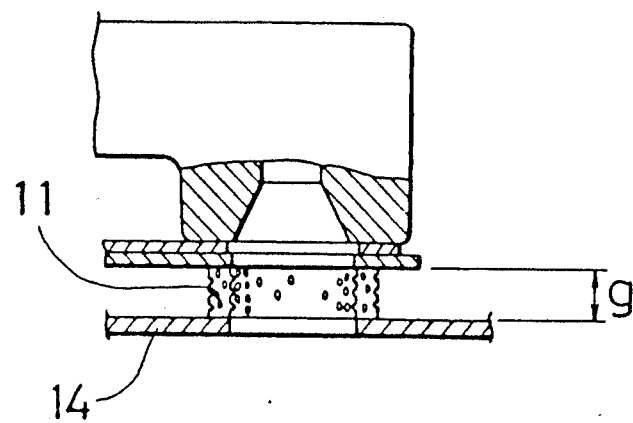
FIG. 4 is a side elevational view to show a condition in which a cover is fitted with the supersonic wave transmitter and receiver shown in FIG. 2.
Figure 5:
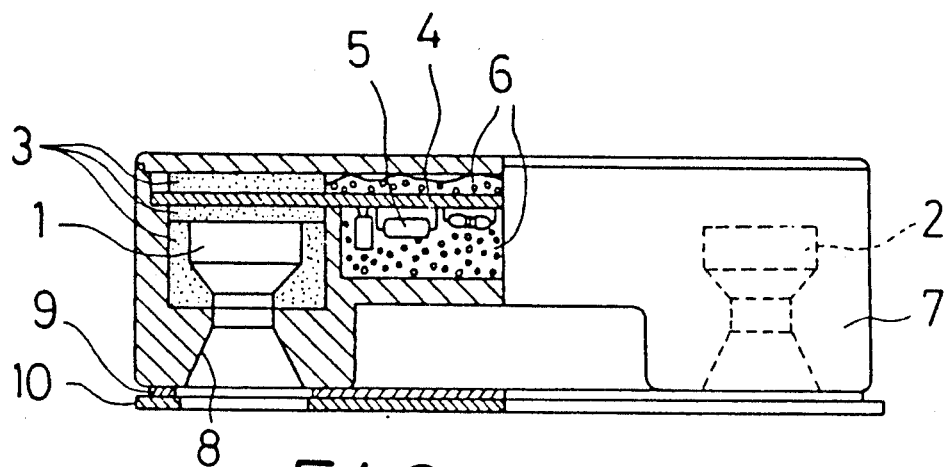
FIG. 5 is a side elevational view to show the prior art.

In case that the supersonic wave sensor is installed under the floor of the vehicle, for example, a cover 14 is mounted to protect the sensor as shown in FIG. 4, at a clearance g between the cover 14 and the turning-in preventive member 11 to cause the supersonic wave to turn into the unit through the clearance. However, in the present invention, such a clearance is avoided due to an arrangement in which the turning-in preventive member 11 is constructed by a resilient member of foamed material.

As described above, the present invention prevents a turning-in of the wave by arranging the cylindrical turning-in preventive member made of foamed material at the opening of either the sender or the receiver and it is not limited to the disclosure in the preferred embodiment.

Therefore, if only the turning-in preventive member made of foamed material is fixed to the opening of either the sender or the receiver, it will be sufficient. As regards the material quality, it will be sufficient if only foamed material having discrete bubbles is used, such as foamed styrol or foamed silicon rubber of the like. As to shape, the cylindrical sectional shape may be circular or in other rectangular shapes.

The preferred embodiment of the present invention has been described in detail so that the objects and features of the present invention may be best understood. It is to be understood that various modifications can be embodied without departing from the appended claims.

We claim:

1. An apparatus for preventing a turning-in of a supersonic wave in a supersonic wave transmitting and receiving device for a vehicle for sensing vehicle height relative to a surface by a reflected supersonic wave, comprising:

a housing for securing at least one of a supersonic wave sender and receiver within said housing, and including a horn at the front surface of each of said sender and receiver, said horn opening outwardly from said housing to permit transmitting and reception of said supersonic wave through an opening in said housing;

a closed, elongated member made of a foamed material having a plurality of exposed discrete bubbles for preventing the turning-in of said supersonic wave located at an outlet of said opening so that a portion thereof is secured to said housing so that an opening defined by said member extends in the direction of transmission or reception of said supersonic wave, said elongated member acting to seal said opening and said horn against spurious wave transmission.

2. The apparatus as set forth in claim 1, wherein said housing includes a heater secured by a bracket at the surface of said housing toward which said horn is opened to permit passage of said supersonic wave by transmission through an opening formed between the housing, the heater, and the bracket, said foamed preventive member extending to close a clearance formed thereby against spurious transmission of said supersonic wave.

3. The apparatus as set forth in claim 2, wherein said foamed preventive member is a cylindrical member having a cut section defining an opening therethrough, said cut section being located within said housing so that said opening lies in the direction of transmission of said supersonic wave.

4. The apparatus as set forth in claim 3, wherein said cylindrical member is formed by foamed rubber.

5. The apparatus as set forth in claim 4, wherein said cylindrical member is formed by foamed silicon rubber.

6. The apparatus as set forth in claim 3, wherein said cylindrical member is formed by foamed polyurethane.

7. The apparatus as set forth in claim 3, wherein said cylindrical member is formed by foamed styrol.

8. The apparatus as set forth in claim 1, wherein said member is secured to said housing by adhesive means.

9. The apparatus as set forth in claim 1, wherein at least an outer portion of said foamed preventive member has exposed, discrete bubbles presenting an irregular surface to said supersonic wave.

10. The apparatus as set forth in claim 1, wherein said foamed material is made from a mat of such material punched by a die and formed into a cylinder shape.

11. The apparatus as set forth in claim 1, wherein each of said sender and receiver includes an insulator of foamed material, said horns being located between said insulators and said closed, elongated members of a foamed material located at an outlet of said openings.

12. The apparatus as set forth in claim 1, further comprising a cover extending across said openings in said housing, said cover having openings in alignment with said openings of said housing, and each said closed, elongated member made of a foamed material being positioned between said housing and said cover around said openings.

13. The apparatus as set forth in claim 12, wherein said closed, elongated members are resilient.

14. An apparatus for preventing a turning-in of a supersonic wave in a supersonic wave transmitting and receiving device having a supersonic wave sender and a supersonic wave receiver for a vehicle in which a vehicle height and the like with respect to a road surface is sensed by a reflected wave of the supersonic wave device, said sender and said receiver each having a horn which opens outwardly to a wave-passing opening in said device, said apparatus being characterized in that a cylindrical member made of foamed material having a plurality of exposed discrete bubbles for preventing the turning-in of the supersonic wave between said sender and said receiver is arranged on said device at an outlet of one of said wave-passing openings in said device and in communication with said horn connecting said wave-passing opening with at least one of the sender or the receiver of the supersonic wave transmitting and receiving device for use in transmitting the supersonic wave signal and receiving the reflected supersonic wave from and to said device.

15. The apparatus of claim 14 wherein said cylindrical member is made from foamed styrol, foamed silicon rubber, or foamed polyurethane.

16. An apparatus for preventing a turning-in of a supersonic wave in a supersonic wave transmitting and receiving device for sensing vehicle height relative to a surface by a reflected supersonic wave, comprising:

a supersonic wave sender and a supersonic wave receiver;

a housing containing said sender and said receiver, said housing having an exterior surface, and each of said sender and receiver having an opening at said surface of said housing;

each of said sender and said receiver including a horn flaring outwardly from a relatively small cross section within said housing to a relatively large cross section at said opening at said surface of said housing; and a cylindrical member defining a central passage, said cylindrical member being secured to said surface of said housing around at least one of said openings so that said passage extends in the direction of propagation of a supersonic wave, said cylindrical member being made of a foamed material having a plurality of exposed discrete bubbles for preventing the turning-in of said supersonic wave.

* * * * *